United States Patent
Schaffner et al.

(10) Patent No.: US 6,749,262 B2
(45) Date of Patent: Jun. 15, 2004

(54) ADJUSTABLE HINGE AND SUPPORT STRUCTURE

(75) Inventors: Walter E. Schaffner, Shavertown, PA (US); Walter A. Watkins, Courtdale, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 0 days.

(21) Appl. No.: 09/793,871

(22) Filed: Feb. 27, 2001

(65) Prior Publication Data

US 2002/0005659 A1 Jan. 17, 2002

Related U.S. Application Data

(60) Provisional application No. 60/185,542, filed on Feb. 28, 2000.

(51) Int. Cl.[7] ................................. B60N 2/02
(52) U.S. Cl. ................ 297/367; 297/378.1; 16/360
(58) Field of Search ................ 297/367, 378.1, 297/378.12, 376; 16/358, 359, 360, 363, 376

(56) References Cited

U.S. PATENT DOCUMENTS

| | | | |
|---|---|---|---|
| 3,065,498 A | 11/1962 | Johnson | 16/166 |
| 3,231,927 A | 2/1966 | Ammon | 16/141 |
| 3,731,342 A * | 5/1973 | Cousin | |
| 3,740,791 A | 6/1973 | Bulin | 16/139 |
| 4,513,832 A | 4/1985 | Engman | 180/6.5 |
| 4,538,857 A | 9/1985 | Engman | 297/423.38 |
| 4,875,735 A * | 10/1989 | Moyer et al. | 297/367 |
| 4,953,259 A | 9/1990 | Frye et al. | 16/225 |
| 5,052,076 A | 10/1991 | Spaeth | 16/266 |
| 5,052,748 A * | 10/1991 | Fourrey et al. | |
| 5,094,310 A | 3/1992 | Richey et al. | 180/65.6 |
| 5,145,020 A | 9/1992 | Quintile et al. | 180/65.1 |
| 5,172,969 A | 12/1992 | Reuter et al. | 312/328 |
| 5,366,037 A | 11/1994 | Richey | 180/65.5 |
| 5,433,507 A * | 7/1995 | Chang | 297/367 |
| 5,588,705 A * | 12/1996 | Chang | |
| 5,725,279 A | 3/1998 | Ward et al. | 297/378.1 |
| 5,749,624 A * | 5/1998 | Yoshida | 297/367 |
| 5,944,131 A | 8/1999 | Schaffner et al. | 180/65.1 |
| 5,956,810 A | 9/1999 | Spaeth | 16/358 |
| 6,045,190 A * | 4/2000 | Ward et al. | 297/378.1 |
| 6,164,720 A * | 12/2000 | Haglund | |

FOREIGN PATENT DOCUMENTS

IT   625400   9/1961

* cited by examiner

*Primary Examiner*—Peter M. Cuomo
*Assistant Examiner*—Stephen Vu
(74) *Attorney, Agent, or Firm*—Drinker Biddle & Reath LLP

(57) ABSTRACT

An adjustable hinge has a cam structure and a pin engaging one of multiple openings to interact with the cam structure and establish a range of rotation for the arms of the hinge. The range of rotation for the hinge is adaptable depending on which of multiple openings is selected for insertion of the pin. A bracket provides for modification in the location of the hinge with respect to a support member as well as the location of an armrest with respect to the bracket.

7 Claims, 11 Drawing Sheets

ADJUSTABLE HINGE AND SUPPORT STRUCTURE

CROSS REFERENCE TO RELATED APPLICATION

This application claims the benefit of U.S. Provisional Application No. 60/185,542 filed Feb. 28, 2000.

FIELD OF THE INVENTION

The present invention relates generally to support structure and more particularly to an adjustable hinge mountable to an adjustable support bracket.

BACKGROUND OF THE INVENTION

Personal mobility vehicles and power wheelchairs have become an increasingly popular means for people with slight or severe disablements to move about independently. What were once simple manual wheelchairs fitted with a motor, have evolved into highly sophisticated vehicles. Dual drive motor power wheelchairs are known; one is illustrated in U.S. Pat. No. 5,944,131. Other power wheelchairs are disclosed in U.S. Pat. Nos. 4,513,832; 4,538,857; 5,094,310; 5,145,020; and 5,366,037.

With more and more people seeking the assistance of powered mobility vehicles, there is increased demand for vehicles which may be modified to fit the individual. There is also a need for better, less expensive methods of manufacturing the vehicles.

One particular area of the personal mobility vehicle in which adaptability would be particularly beneficial is the seat. Since people who use personal mobility vehicles typically spend many hours each day in them, it is important that the seat be as comfortable as possible. To this end, users would prefer seats that may be configured to their individual requirements.

Seats are known in the art having a hinged structure supporting seat and back portions in which the back rotates relative to the seat between an open or upright configuration for sitting and a closed or collapsed configuration for storage, for example. What is needed is an adjustable hinged structure supporting seat and back portions in which the range of rotation of the backrest portion may be adapted by a user to modify the angle between the back and seat portion in the upright or open configuration.

In conventional personal mobility vehicles having hinged structure supporting seat and back portions, the hinges are often welded to a support member that also accepts supports for armrests. In order to fit a conventional vehicle with different sized seats, the hinges would need to be welded to the support member in different locations. The present invention overcomes the need for welding the hinges to the armrest tube by providing brackets for each hinge which are relocatable along the support member. Thus the manufacturer of the vehicle can produce the same support member and bracket for use with a variety of sized seats. The brackets of the present invention may also be used to attach accessories to the vehicle other than seat type structures.

It is also desirable that the armrest supported by the personal mobility vehicle be adjustable. Different users may prefer the armrests to be closer or farther from them, even with the same sized seat. Furthermore, the same user may wish to change the position of the armrests for different activities. The present invention incorporates an adjustable armrest structure into the above described adjustable bracket for the seat hinge. Thus, the same bracket provides independent adjustment for the armrests as well as the seat hinges.

SUMMARY OF THE INVENTION

The present invention is directed to an adjustable hinge and support structure. A first hinge arm having multiple openings is rotatably connected to a second hinge arm having a cam structure. A pin inserted in one of the openings interacts with the cam structure to limit rotation of the hinge arm within a range of rotation. The range of rotation for the hinge is adjustable depending on which of the multiple openings is chosen for insertion of the pin.

The present invention also provides for adjustability in the positioning of the hinge with respect to the support structure as well as the positioning of an accessory. A bracket includes an opening for slidable receipt of the bracket on a support member. A first treaded opening in the bracket provides for releasable securement of the bracket to the support member. A second threaded opening in the bracket is aligned with a slot in the support member for releasable securement of an accessory support slidably received within the support member.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE DRAWINGS

Figure 1:
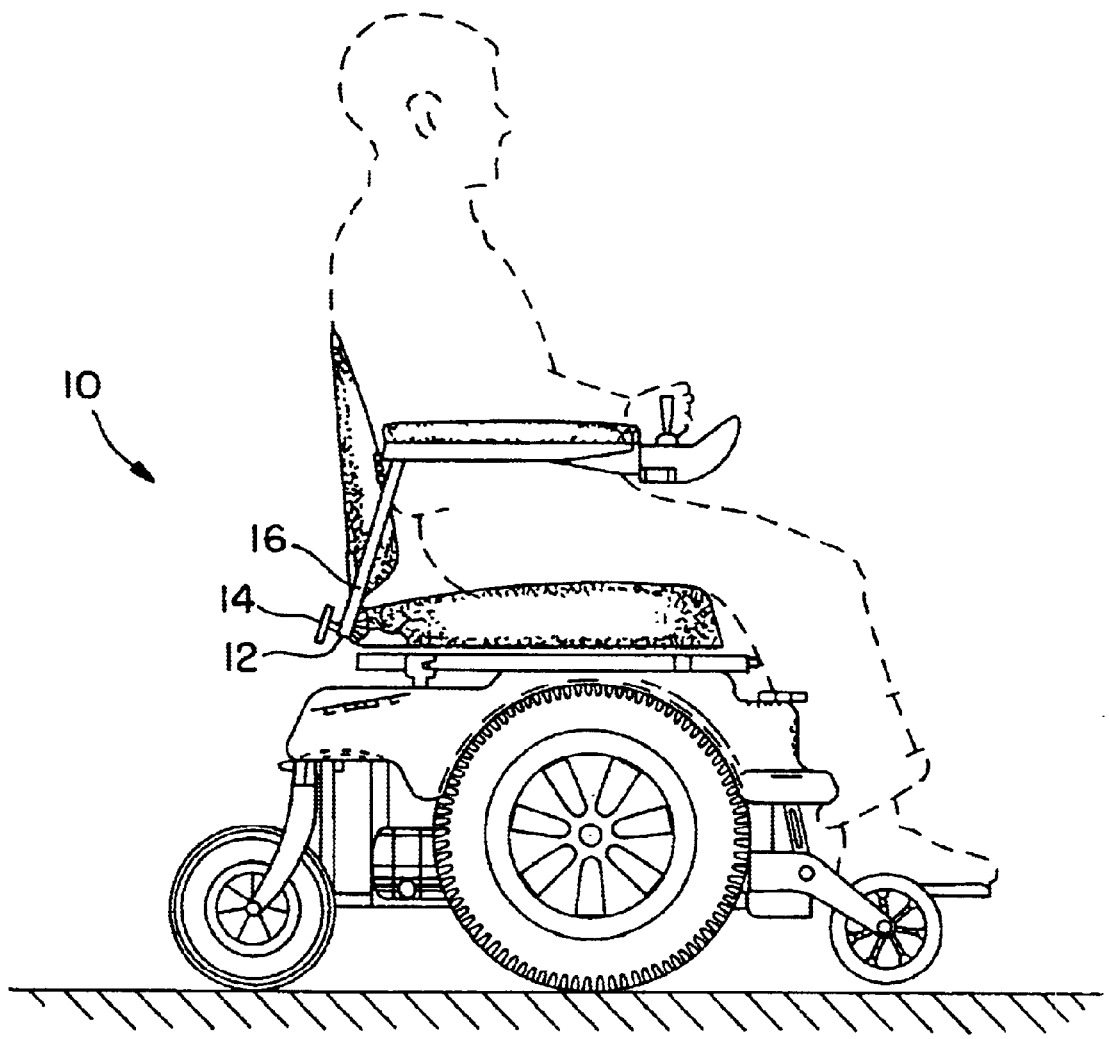
FIG. 1 is a side view of a power wheelchair.

In the drawings where like numerals identify like elements, there is shown an adjustable hinge and support structure according to the present invention.

Figure 2:
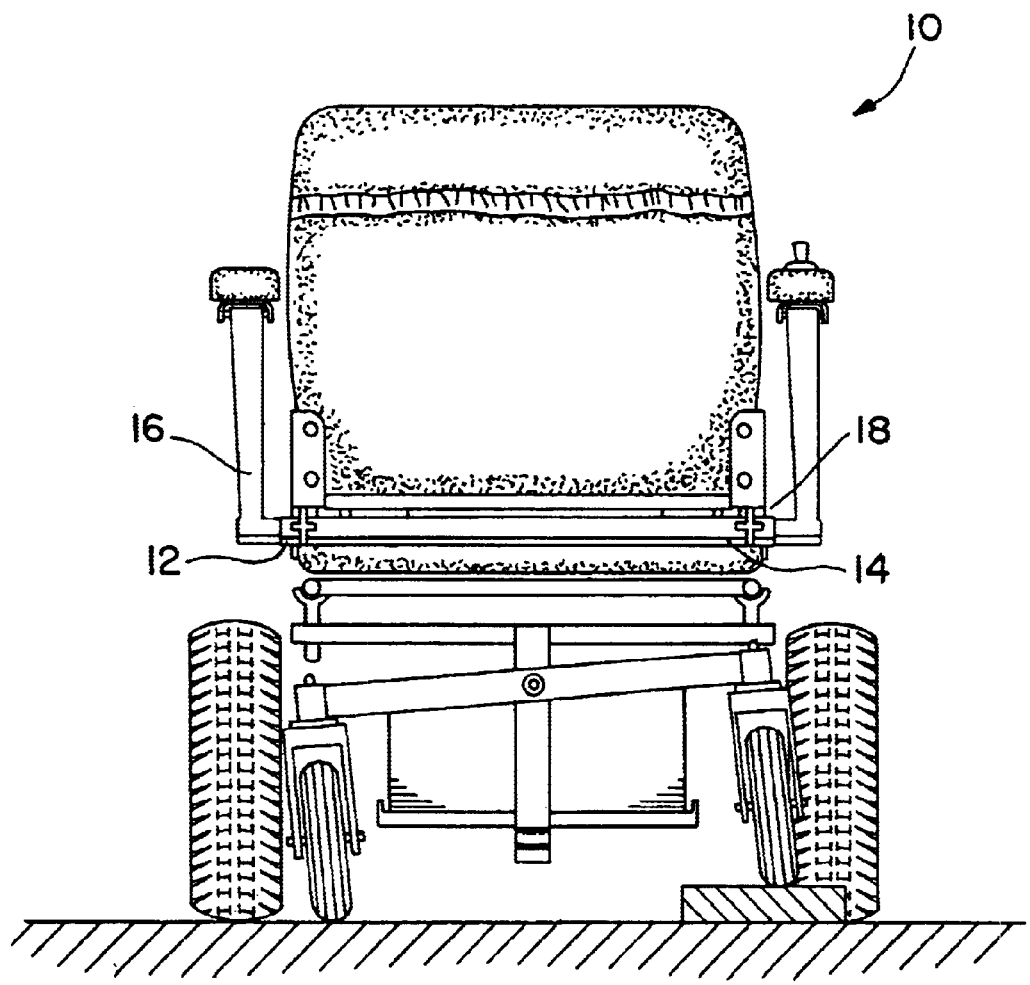
FIG. 2 is a rear view of a power wheelchair incorporating a hinge and support tube.

In FIGS. 1 and 2 there is shown a mid-wheel drive power wheelchair which is generally referred to by the numeral 10. The wheelchair 10 is of the type generally shown and described in commonly assigned U.S. Pat. No. 5,944,131, which is herein incorporated by reference. The wheelchair 10 has a support tube 12 on which hinges to support a seat are mounted. Threaded knobs 14 are provided to allow accessory support structures 16 to be adjusted within the support tube 12. It is noted that the present invention is not limited to power wheelchairs such as that shown. The hinge structure may be applied to any number of seats or chairs, including but not limited to those attached to scooters and personal mobility vehicles.

Figure 3:
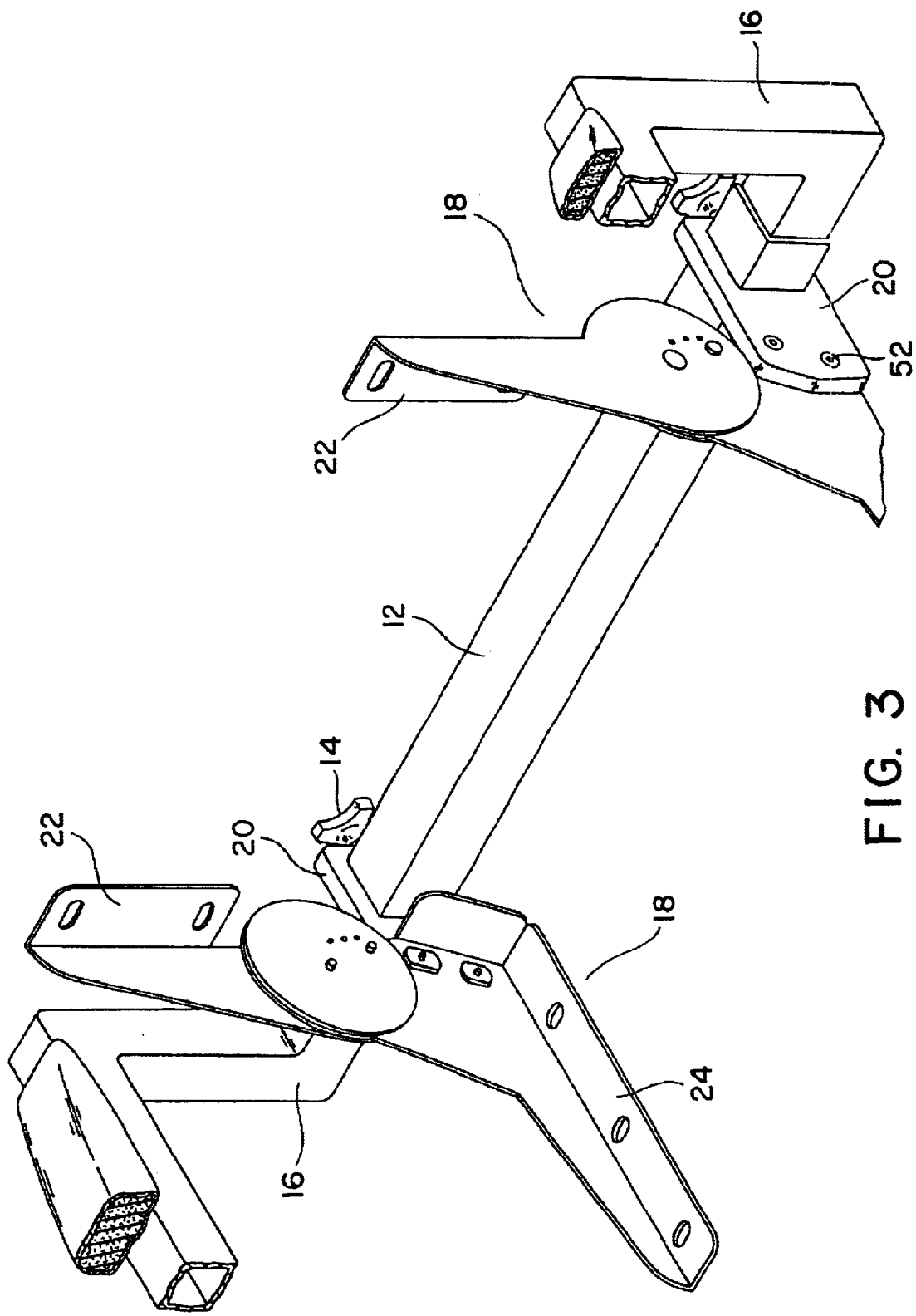
FIG. 3 is an oblique view of the assembled seat hinge and support structure according to the present invention.

Turning to FIG. 3, two hinges according to the present invention are shown. Each hinge 18 is mounted to a bracket 20, which is in turn mounted to a support tube 12. Inserted into either end of the support tube 12 are armrest support structures 16. The hinges 18 each include a seat back mounting structure 22, and a seat bottom mounting structure 24. The seat back and bottom are not shown in this view. It is noted at this juncture that the brackets 20 may be used to mount customer specific accessories and/or hinge structures other than the hinges 18 as illustrated.

Figure 4:
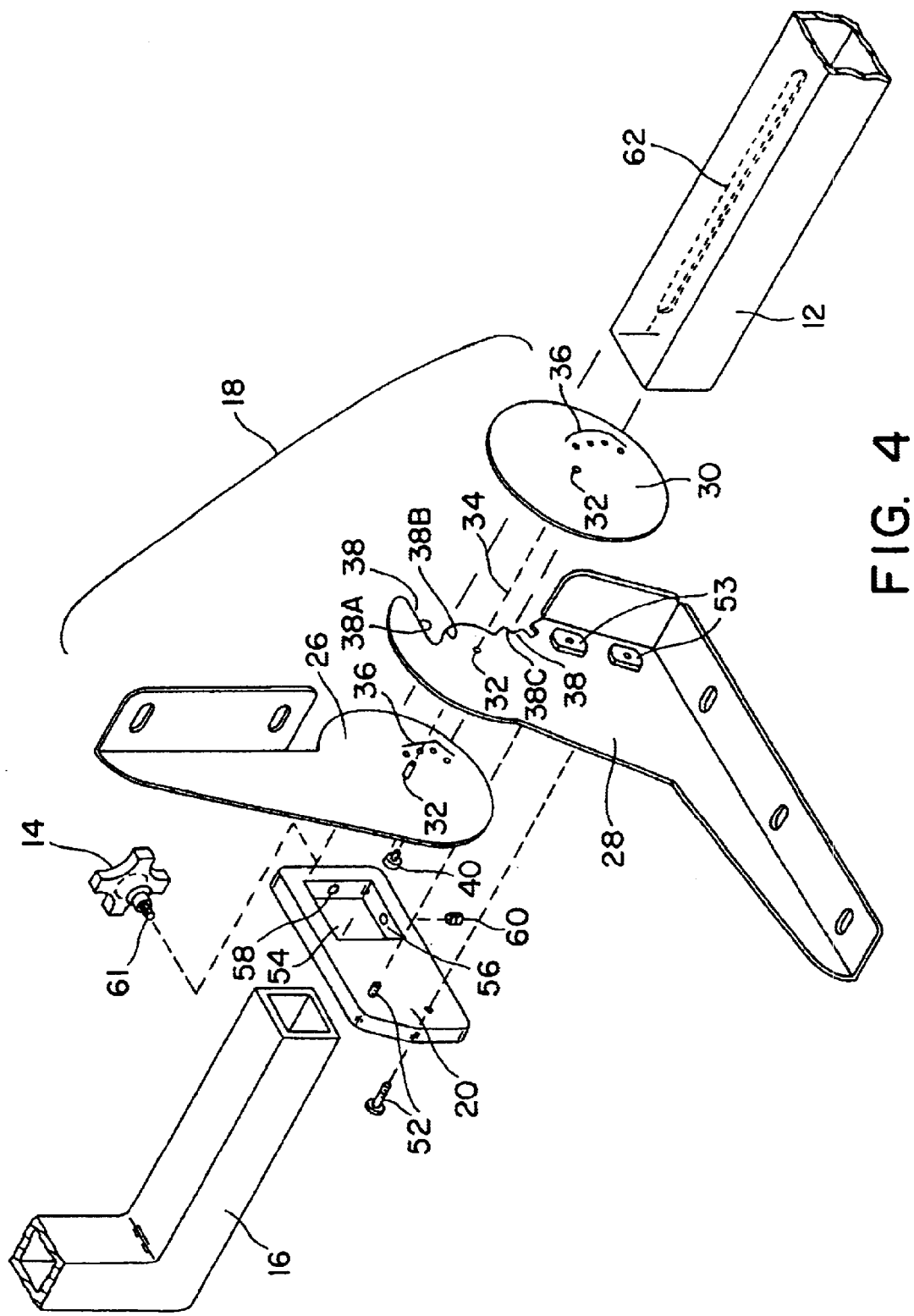
FIG. 4 is an exploded view of the adjustable hinge and support structure.

Turning to FIG. 4, an exploded view shows the manner in which the various parts of the adjustable hinge and support structure are assembled. The hinge 18 comprises a back plate 26, a bottom plate 28, and an inside plate 30. The plates are rotatably joined at their respective points of rotation 32 along an axis of rotation 34 which is perpendicular to the surface of the plates. The bottom plate 28 is positioned between the back plate 26 and the inside plate 30.

The back plate 26 and the inside plate 30 are fixedly attached to one another, while remaining rotatable with respect to the bottom plate 24. The back plate 26 and the inside plate 30 may be connected in fixed relation by a press-fit rivet, or other means, extending through an opening in the bottom plate 24. It should be noted that washers or bearings (not shown) may be positioned between the back plate 26, the bottom plate 28 and the inside plate 30.

The back plate 26 and the inside plate 30 each have a set of matching holes 36. The back plate 26 and the inside plate 30 are arranged so that each of the holes of the back plate 26 is aligned with a corresponding hole of the inside plate 30. The bottom plate 28 has a cam structure 38 extending about the point of rotation 32 of the bottom plate 28. A pin 40 is releasably inserted through one of the matching holes 36 in the back plate 26 and the corresponding hole 36 in the inside plate 30. Thus, when the pin 40 is inserted through the back plate 26 and the inside plate 30, the pin 40 limits the degree of rotation of the back plate 26 and the inside plate 30 relative to the bottom plate 28, due to contact of the pin 40 with the cam structure 38.

Figure 5:
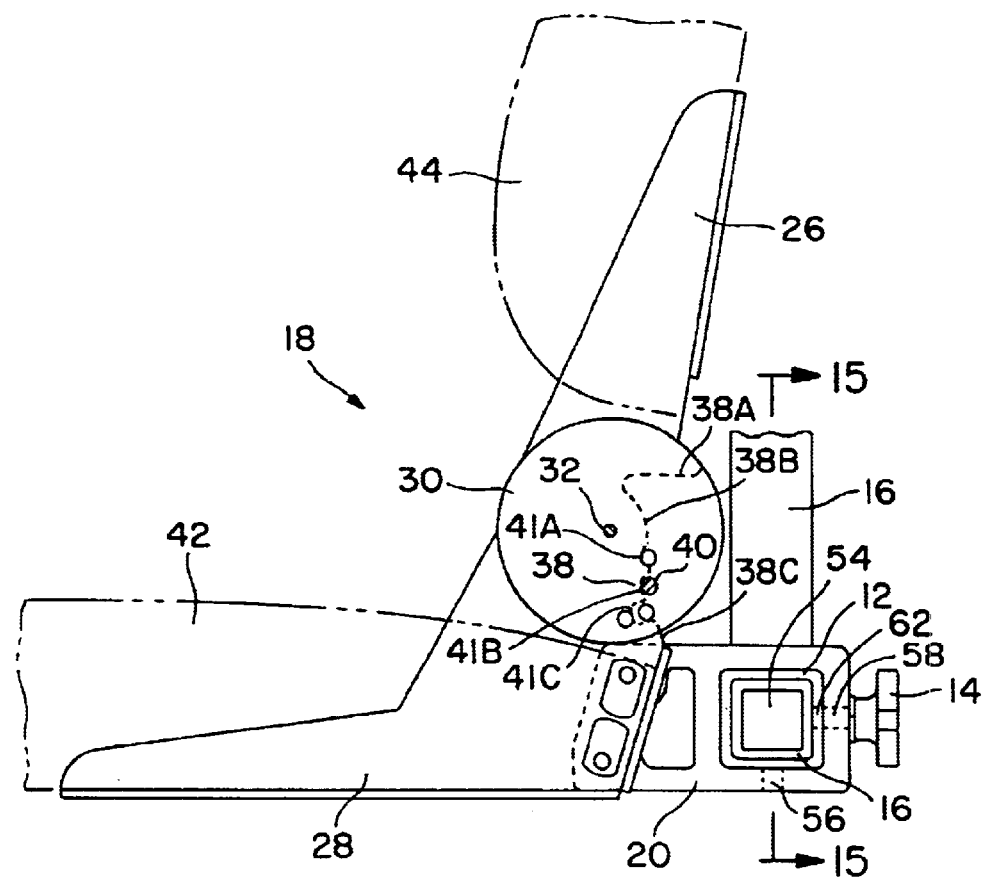
FIG. 5 is a side elevation of the adjustable hinge and support structure showing a seat back in the upright position.
Figure 6:
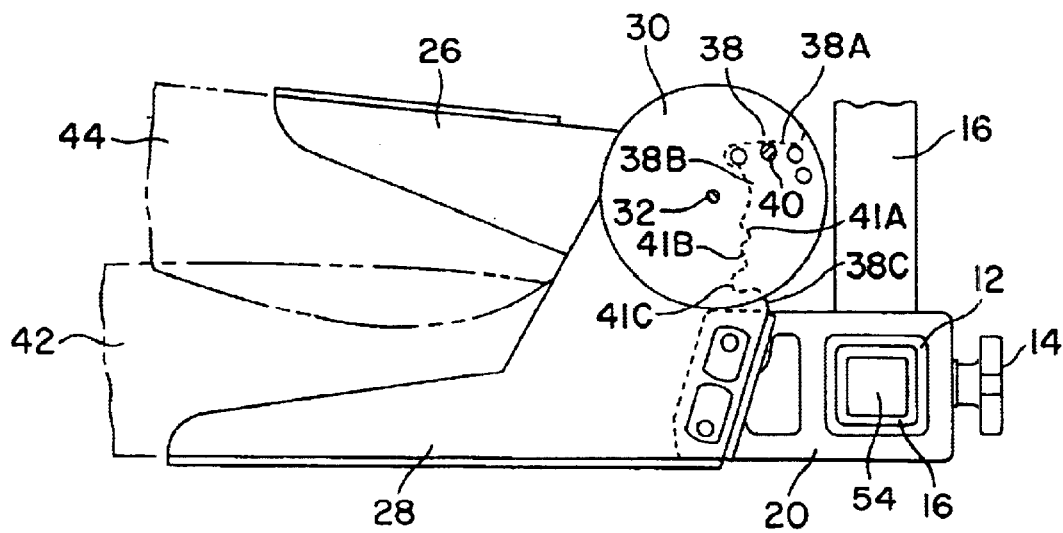
FIG. 6 is a side elevation of the adjustable hinge and support structure showing a seat back in the lowered position.
Figure 7A:
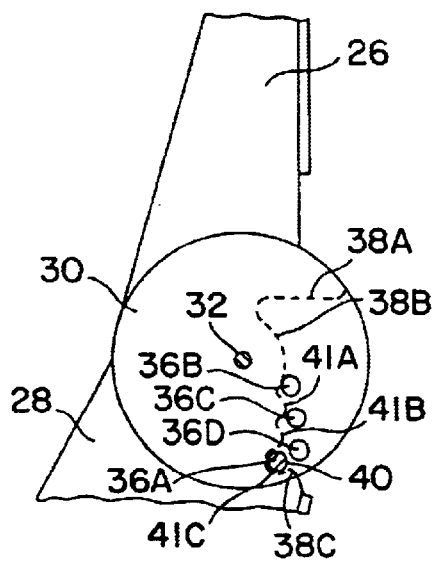
FIGS. 7A–7D show a hinge of the present invention in various upright positions with the pin set in various locations.
Figure 7B:
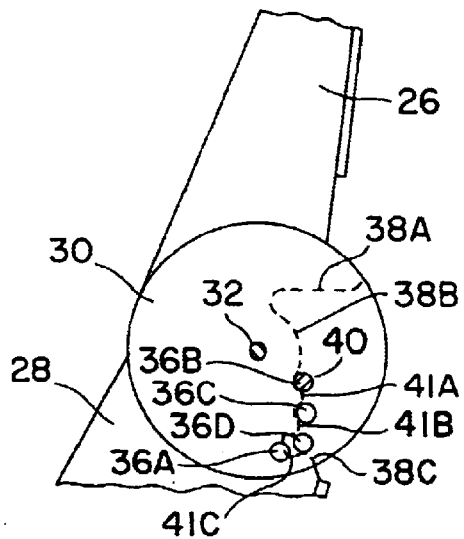
Figure 7C:
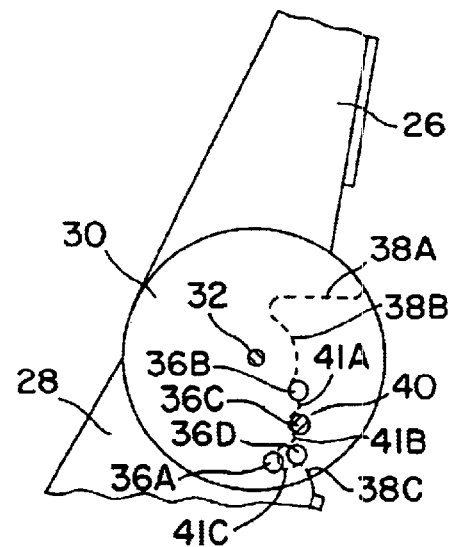
Figure 7D:
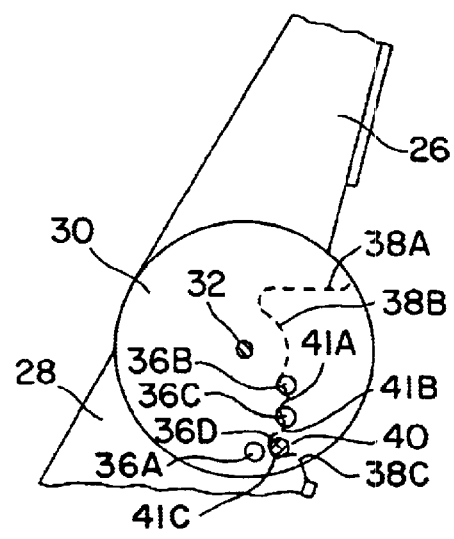

The interaction of the pin 40 with the cam structure 38 is better seen in FIGS. 5 and 6. The cam structure 38 includes a peripheral edge of the bottom plate 28. The peripheral edge includes indenting end portions 38A and 38C on opposite sides of an interconnecting central portion 38B which extends generally tangentially. End portion 38C is stepped to create radially and tangentially disposed stops 41A–41C. As may be seen, the stops 41A–41C are positioned radially with respect to point of rotation 32 such that pin 40 will contact one of the stops when it is inserted in each of openings 36. The stops 41A–41C establish a first one of two boundaries limiting the range of rotation of the hinge which corresponds to an open position of hinge 18 or a generally upright position for seat back 44 supported by hinge 18. As shown in FIG. 5, seat back 44 is prevented in this upright position from further clockwise rotation with respect to seat bottom 42 through contact between pin 40 and stop 41B. The stepped configuration of the stops 41A–41 C results in tangential staggering of the stops providing for variation in the range of rotation for the hinge 18, as will be described below in relation to FIG. 7. The indenting end portion 38A is not stepped but is generally planar. The end portion 38A establishes the second boundary limiting the range of rotation for hinge 18. This second boundary for the range of rotation corresponds to a closed position of hinge 18 or a collapsed position of seat back 44 supported by hinge 18. As shown in FIG. 6, the seat back 44 is prevented from further counterclockwise rotation from contact between pin 40 and end portion 38A of cam structure 38. Also, because of the disks covering the cam structure, the stops are not accessible by fingers or the like. This results in a reduction of the likelihood of a pinching occurring when the seat back in moved into its upright position (FIGS. 5 and 7A–D).

FIG. 7 illustrates the variation in the range of rotation provided by the tangentially staggered stops 41A–41C of portion 38C of cam structure 38. Referring first to FIG. 7A, the pin 40 is shown inserted in holes 36A of back plate 26 and inside plate 30. The hinge 18 is shown with back plate 26 rotated to the first boundary in the range of rotation such that the upright position of the seat back 44, not shown, is a relatively vertical orientation. In FIG. 7B, the pin 40 is shown inserted in holes 36B providing an increased range of rotation in which the first boundary is associated with an upright position for the seat back which is slightly beyond vertical. FIGS. 7C and 7D show the pin 40 inserted in holes 36C and 36D, respectively, each providing for an increase in the range of rotation for hinge 18.

Figure 8:
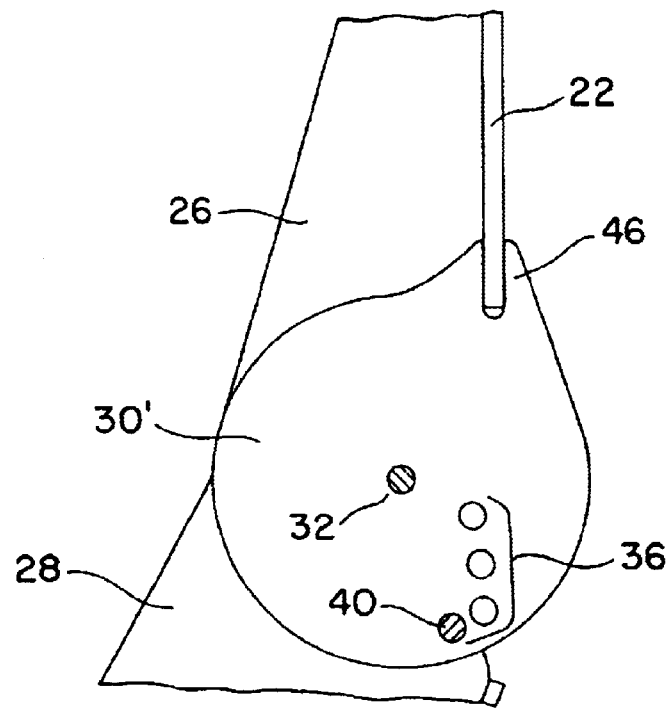
FIG. 8 is a side elevation of an embodiment of the inside plate incorporating a forked structure for engaging the seat back mounting structure of the back plate.
Figure 9:
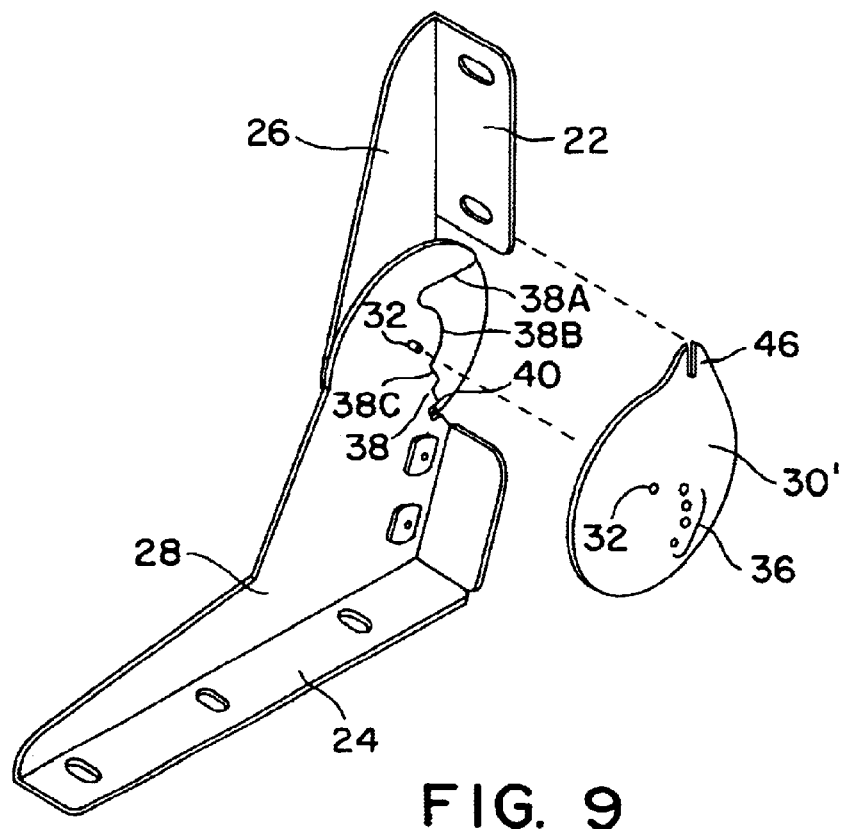
FIG. 9 is an oblique view of a hinge according to the present invention incorporating the inside plate of FIG. 8.

Turning to FIGS. 8 and 9, an inside plate 30' according to an embodiment of the present invention is shown. The inside plate 30' has a forked structure 46 that engages the seat back mounting structure 22 to prevent the inside plate 30' from rotating relative to the back plate 26.

Figure 10:
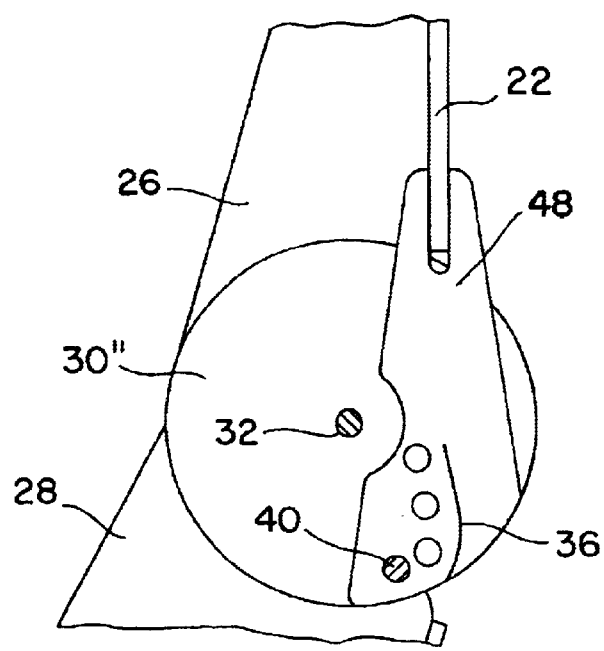
FIG. 10 is a side elevation of an embodiment of the inside plate having a forked plate attached thereto for engaging the seat back mounting structure of the back plate.
Figure 11:
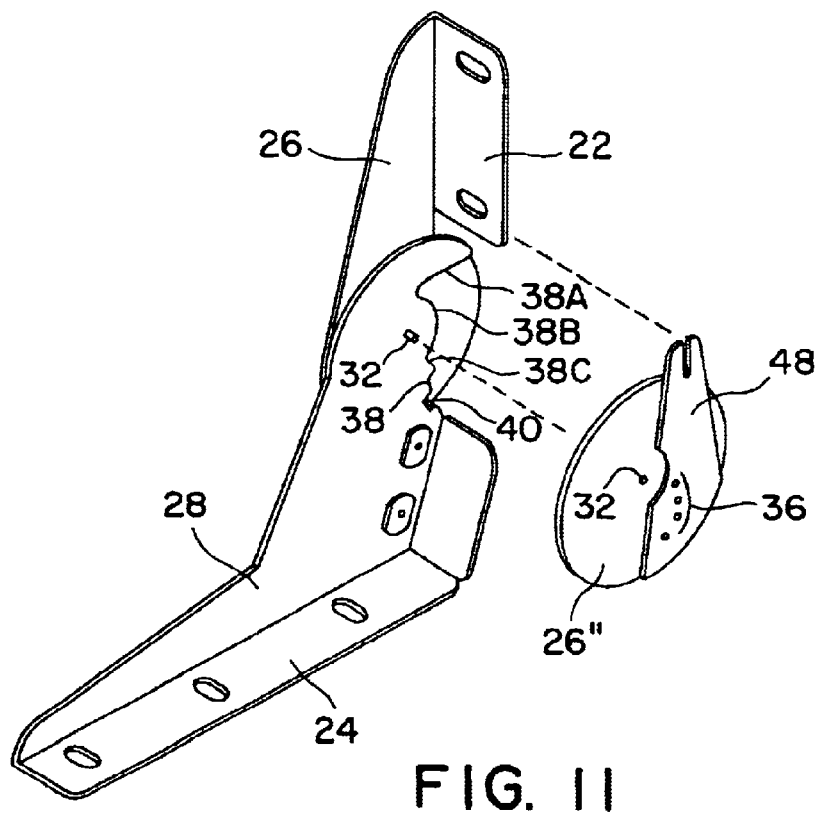
FIG. 11 is an oblique view of a hinge according to the present invention incorporating the inside plate of FIG. 10.

Turning to FIGS. 10 and 11, an inside plate 30" according to an embodiment of the present invention is shown. The inside plate 30" is fixedly attached to a forked plate 48. The forked plate 48 engages seat back mounting structure 22 to prevent the inside plate 30" from rotating relative to the back plate 26.

Figure 12:
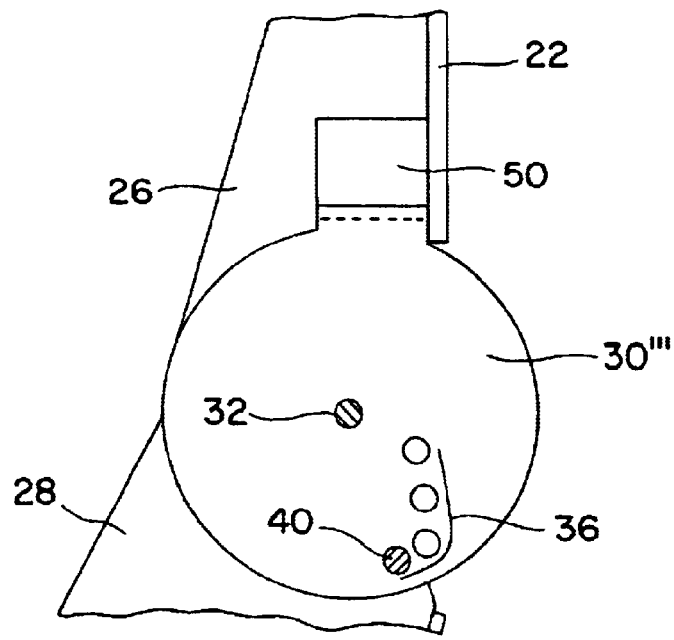
FIG. 12 is a side elevation of an embodiment of the inside plate incorporating a tab structure for engaging the seat back mounting structure of the back plate.
Figure 13:
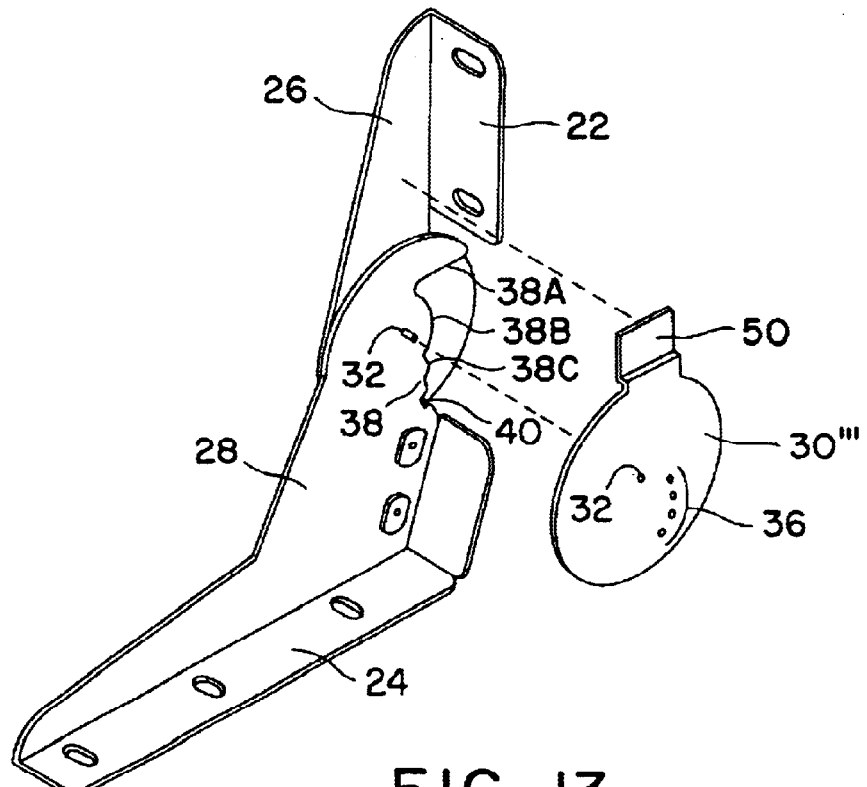
FIG. 13 is an oblique view of a hinge according to the present invention incorporating the inside plate of FIG. 12.

In FIGS. 12 and 13 there is shown an inside plate 30''' according to the present invention having a tab structure 50 extending from the edge of the inside plate 30'''. The tab structure 50 is fixedly attached to the inside surface of the back plate 26 such that the inside plate 30''' is prevented from rotating relative to the back plate 26. The tab structure 50 may be fixed to the back plate 26 by welding, adhesive, or any other common means for attaching two flat objects.

Referring again to FIG. 3, the hinges 18 are attached to the brackets 20 with bolts 52. The bolts 52 extend into threaded holes 53 within the bottom plate 28 of the hinge 20. However, the brackets 20 could also be welded to the hinges 18 (or other structures), or attached in any other suitable manner. In the same manner the brackets can be used to attach other customer specific structures to the support 12.

As illustrated, the brackets 20 are releasably secured to the support 12 providing for adjustment in the positioning of hinges 18 with respect to support 12 and therefore with respect to the wheelchair 10. As will also be described, the brackets 20 are also provide for releasable securement of an armrest support structure 16 within the support 12. This provides for adjustment in the positioning of a supported armrest with respect to the support 12 and therefore with respect to the wheelchair 10.

Turning to FIG. 4, the bracket 20 has a tube support opening 54, through which the support tube 12 is inserted and slidably received. A first threaded hole 56 is provided which extends from the tube support opening 54 to the outside of the bracket 20. A second threaded hole 58 extends from the tube support opening 54 to the outside of bracket 20. When the support tube 12 is inserted into the tube support opening 54, the second threaded hole 58 is aligned with a slot 62 in the support tube 12. A set screw 60, or other threaded member, is inserted into the first threaded hole 56 and tightened against the support tube 12 to secure the bracket 20 to the support tube 12 in a selected location. The releasable securement provided by set screw 60 allows for loosening and repositioning of the bracket, and the attached hinge 18, with respect to the support tube 12.

The knob 14 has a threaded member 61 which is inserted into the second threaded hole 58. The alignment of slot 62 of the support tube 12 with the second hole 58 allows for passage of the threaded member 61 through the support member 12 for contact with an armrest support structure 16 slidably received inside the support tube 12. It should be noted that any threaded member could be used in place of set screw 60 or threaded knob 14. Here, a set screw is used in the bracket location hole 56 because the seat width will establish the location of the hinges 18 which will not thereafter require adjustment unless a different seat were to be added. However, a knob 14 is provided for second threaded hole 58 to facilitate the more likely adjustment desired for the location of an accessory, such as an armrest, relative to the support tube 12.

Figure 14:
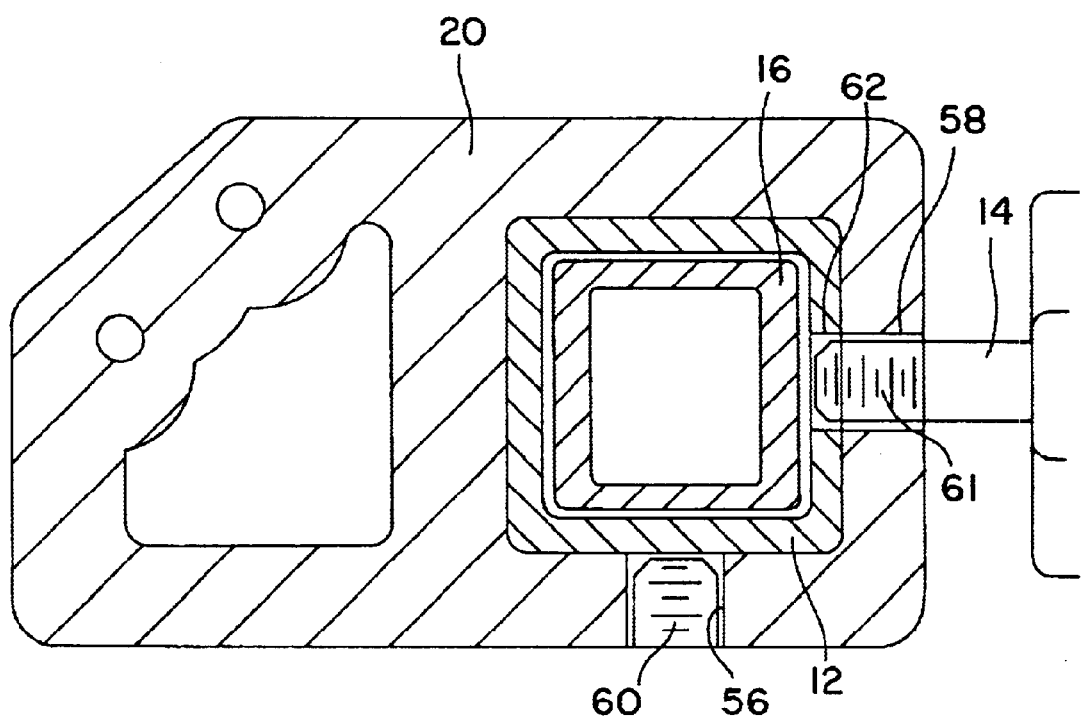
FIG. 14 is a side sectional view of the bracket assembly.
Figure 15:
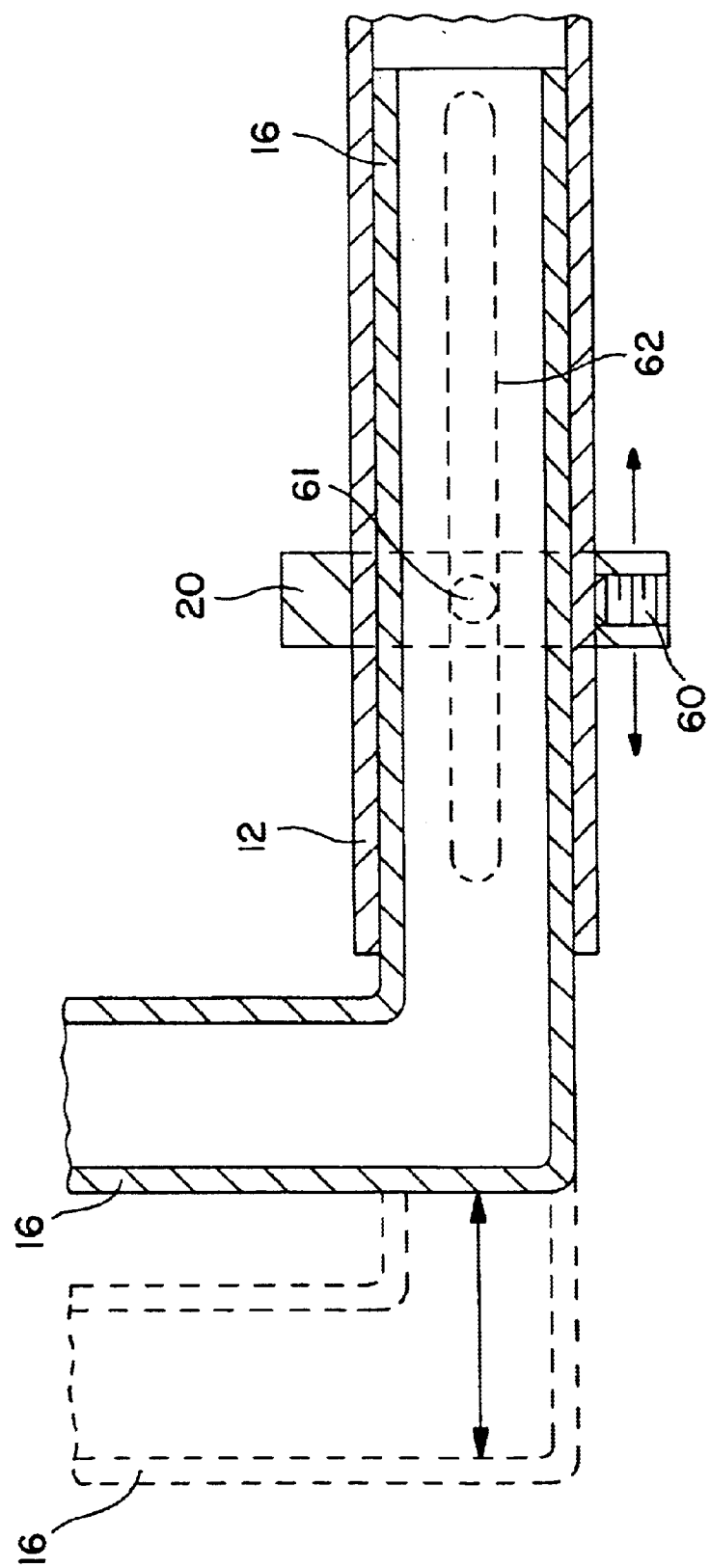
FIG. 15 is a rear sectional view showing the adjustability of the accessory inserted into the hollow support tube.

The interaction of the set screw 60 and knob 14 with the support tube 12 and armrest support structure 16 is more clearly shown in the sectional views of FIGS. 14 and 15. The set screw 60 engages the support tube 12 to releasably fix the position of the bracket to the support tube 12. The threaded portion 61 of the knob 14 passes through the slot 62 in support tube 12 and engages the armrest support structure 16. This releasably fixes the position of the armrest support structure 16 with respect to the bracket 20. When both the set screw 60 and the knob 14 are loosened, the support tube 12 and the armrest support structure 16 are free to slide independently along the longitudinal axis of the support tube 12.

FIG. 15 is a front sectional view of the support tube 12 and bracket 20 showing how armrest support structure 16 is adjustable in and out of the support tube 12. The alignment of treaded member 61 of knob 14 with slot 62 in support tube 12 which permits engagement of the threaded member with armrest support structure 16 is also shown.

It will be appreciated that the present invention is not limited to the specific embodiments shown here. For instance, the adjustable hinge and support structure shown are not limited to use with power wheelchairs or other personal mobility vehicles. Also, the accessory inserted into the support tube 12 is not limited to armrests. The present invention is shown and described for use with a personal mobility vehicle for illustrative purposes only, and it will be understood that the invention has many applications beyond personal mobility vehicles.

The present invention may be embodied in other specific forms without departing from the spirit or essential attributes thereof and, accordingly, reference should be made to the appended claims, rather than to the foregoing specification, as indicating the scope of the invention.

What is claimed is:

1. An adjustable seat comprising:

a seat bottom portion;

a seat back portion;

a pair of first hinge arms each having a seat back mounting structure secured to one of opposite sides of said seat back portion, each of said first hinge arms having a plurality of openings radially disposed about an axis of rotation;

a pair of second hinge arms each having a seat bottom mounting structure secured to one of opposite sides of said seat bottom portion, each of said second hinge arms rotatably connected to one of said first hinge arms at said axis of rotation, each of said second hinge arms having a cam structure extending about said axis of rotation; a pair of pins each removably inserted in one of corresponding openings of said first hinge arms for interaction with the cam structures of said second hinge arms to limit rotation of said first hinge arms with respect to said second hinge arms within a range of rotation, said range of rotation being variable depending on the particular corresponding openings of said first hinge arms chosen for said pins; and a pair of plates each having a plurality of openings, each of said plates secured against rotation relative to one of said first hinge arms such that the plurality of openings of said plate is aligned with the plurality of openings of said first hinge arm, each of said second hinge arms positioned between one of said first hinge arms and one of said plates, each of said pins extending between aligned openings of one of said first hinge arms and one of said plates.

2. An adjustable seat comprising:

a seat bottom portion;

a seat back portion;

a pair of first hinge arms each having a seat back mounting structure secured to one of opposite sides of said seat back portion, each of said first hinge arms having a plurality of openings radially disposed about an axis of rotation;

a pair of second hinge arms each having a seat bottom mounting structure secured to one of opposite sides of said seat bottom portion, each of said second hinge arms rotatably connected to one of said first hinge arms at said axis of rotation, each of said second hinge arms having a cam structure extending about said axis of rotation;

a pair of pins each removably inserted in one of corresponding openings of said first hinge arms for interaction with the cam structures of said second hinge arms to limit rotation of said first hinge arms with respect to said second hinge arms within a range of rotation, said range of rotation being variable depending on the particular corresponding openings of said first hinge arms chosen for said pins; and a pair of attachment brackets each secured to one of said second hinge arms, said brackets having an opening adapted for slidably engaging an elongated seat support member, each of said brackets further including a threaded hole communicating with said opening for receiving a threaded member to releasably secure said bracket to said seat support member, wherein said seat support member is hollow for slidable receipt of an armrest support internally of said seat support member, said seat support member further having a longitudinally extending slot, and wherein said bracket further includes a second threaded hole communicating with said opening for receiving a second threaded member, said second hole aligned with said slot for securement of said armrest support to said bracket by said second threaded member.

3. A vehicle comprising:

an elongated support member secured to said vehicle; and an adjustable hinge having first and second hinge arms, one of said first and second hinge arms secured to said elongated support member, said first hinge arm having a plurality of openings radially disposed about an axis of rotation, said second hinge arm rotatably connected to said first hinge arm at said axis of rotation, said second hinge arm having a cam structure extending about said axis of rotation, said adjustable hinge further having a pin removably inserted in one of the openings of said first hinge arm for interaction with the cam structure of said second hinge arm to limit rotation between said first and second hinge arms within a range of rotation, said range of rotation being variable depending on the particular opening chosen for said pin, wherein said adjustable hinge comprises a plate having a plurality of openings, said plate secured against rotation relative to said first hinge arm such that each one of the plurality of openings of said plate is aligned with one of the plurality of openings of said first hinge arm, said second hinge arm positioned between said first hinge arm and said plate, said pin extending between aligned openings of said first hinge arm and said plate.

4. A vehicle comprising:

an elongated support member secured to said vehicle;

an adjustable hinge having first and second hinge arms, one of said first and second hinge arms secured to said elongated support member, said first hinge arm having a plurality of openings radially disposed about an axis of rotation, said second hinge arm rotatably connected to said first hinge arm at said axis of rotation, said second binge arm having a cam structure extending about said axis of rotation, said adjustable hinge further having a pin removably inserted in one of the openings of said first hinge arm for interaction with the cam structure of said second hinge arm to limit rotation between said first and second hinge arms within a range of rotation, said range of rotation being variable depending on the particular opening chosen for said pin; and a pair of attachment brackets each secured to one of said second hinge arms, said brackets having an opening adapted for slidably engaging said elongated support member, each of said brackets further including a threaded hole communicating with said opening for receiving a threaded member to releasably secure said bracket to said support member, wherein said support member is hollow for slidable receipt of a pair of armrest supports internally of said support member, said support member further having a longitudinally extending slot, and wherein each of said brackets further includes a second threaded hole communicating with said opening for receiving a second threaded member, said second hole aligned with said slot for securement of one of said armrest supports to said bracket.

5. A vehicle comprising:

a seat having a bottom portion and a back portion;

an elongated support member defining a hollow interior and including an elongated slot;

at least one hinge having pivotably connected arms secured to the bottom and back portions of the seat, the arms of the hinge being pivotable with respect to each other within a range of pivot that is adjustable;

an attachment member secured to one of the hinge arms, the attachment member engaging the elongated support member and having first and second threaded holes extending through a portion thereof, the second threaded hole positioned for alignment with the elongated slot of the elongated support member;

an accessory having an elongated portion slidably received in the hollow interior of the elongated support member;

a first threaded member received in the first threaded hole of the attachment member for engagement with the elongated support member; and a second threaded member received in the second threaded hole of the attachment member and extending through the slot in the support member for contact with the elongated portion of the accessory.

6. In a vehicle having a seat that includes back and bottom portions pivotably connected to each other, the improvement comprising:

at least one adjustable hinge having first and second arms, the first hinge arm secured to one of the back and bottom portions of the seat, the second hinge arm secured to the other of the back and bottom portions of the seat, the first hinge arm including a plurality of openings, the second hinge arm having a peripheral edge portion, the second hinge arm pivotally connected to the first hinge arm at an axis of rotation, the hinge further including a pin receivable in the openings of the first hinge arm to extend adjacent the peripheral edge portion of the second hinge arm, the peripheral edge portion adapted to engage the pin and limit pivot between the first and second hinge arms within a range of rotation, the range of rotation being variable depending on the particular opening receiving the pin.

an elongated seat support member defining a hollow interior and having an elongated slot;

an attachment member secured to one of the hinge arms and engaging the elongated seat support member, the attachment member having first and second threaded holes extending through a portion thereof, the second threaded hole positioned for alignment with the slot of the seat support member;

a first threaded member received in the first threaded hole of the attachment member for engagement with the elongated seat support member; and a second threaded member received in the second threaded hole of the attachment member and extending through the slot in the seat support member for contact with an elongated portion of an armrest received within the hollow interior of the seat support member.

7. In a vehicle including a seat having back and bottom portions pivotably connected to each other by at least one hinge, the improvement comprising:

an elongated support member secured to the vehicle for support of the seat, the elongated seat support member defining a hollow interior and an elongated slot;

at least one armrest having a portion slidably received within the hollow interior of the elongated seat support member;

at least one armrest adjustment member secured to the seat and having first and second threaded holes extending through a portion thereof, the armrest adjustment member engaging the elongated seat support member such that the second threaded hole is aligned with the slot in the elongated support member;

a first threaded member received in the first threaded hole of the armrest adjustment member for engagement with the elongated seat support member; and a second threaded member received in the second threaded hole of the armrest adjustment member and having a sufficient length to extend through the slot in the seat support member to engage the portion of the armrest received within the hollow interior of the elongated seat support member.

* * * * *